Figure 1:
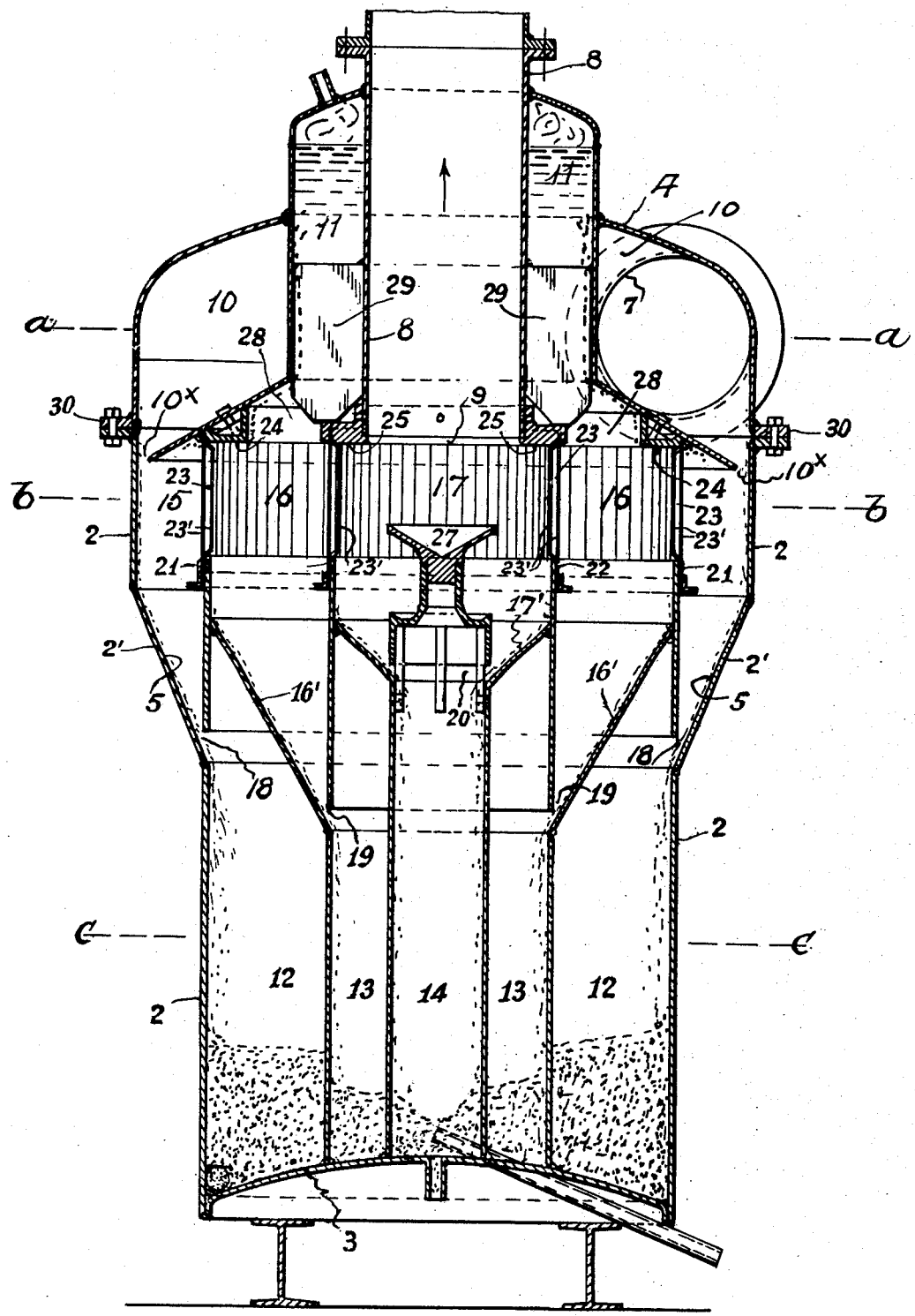

Nov. 30, 1937.                C. G. HAWLEY                 2,100,661
                             LIQUID PURIFIER
                         Filed Nov. 16, 1934            3 Sheets-Sheet 1

INVENTOR
Charles G. Hawley.
BY Mason & Mason
ATTORNEYS

Nov. 30, 1937.    C. G. HAWLEY    2,100,661
LIQUID PURIFIER
Filed Nov. 16, 1934    3 Sheets-Sheet 2
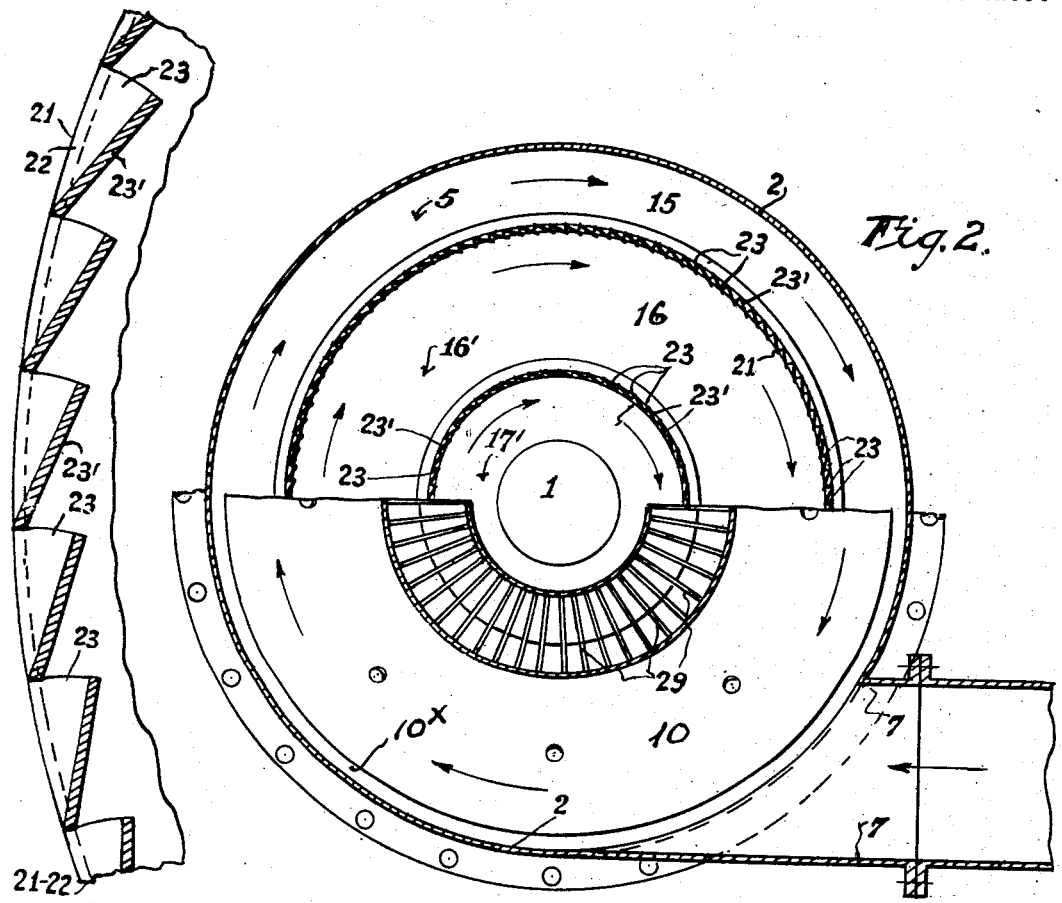
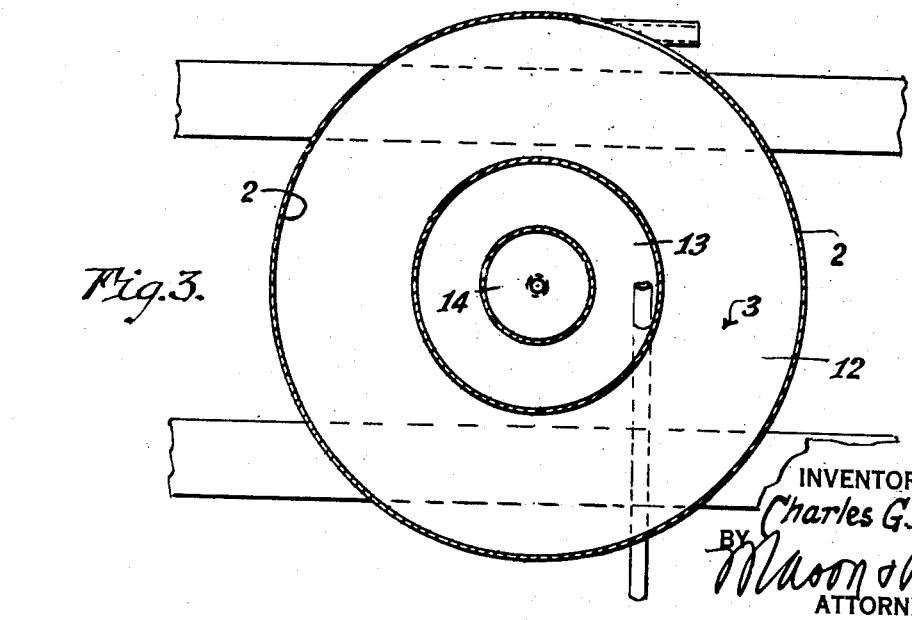
INVENTOR
Charles G. Hawley
BY Mason & Mason
ATTORNEYS

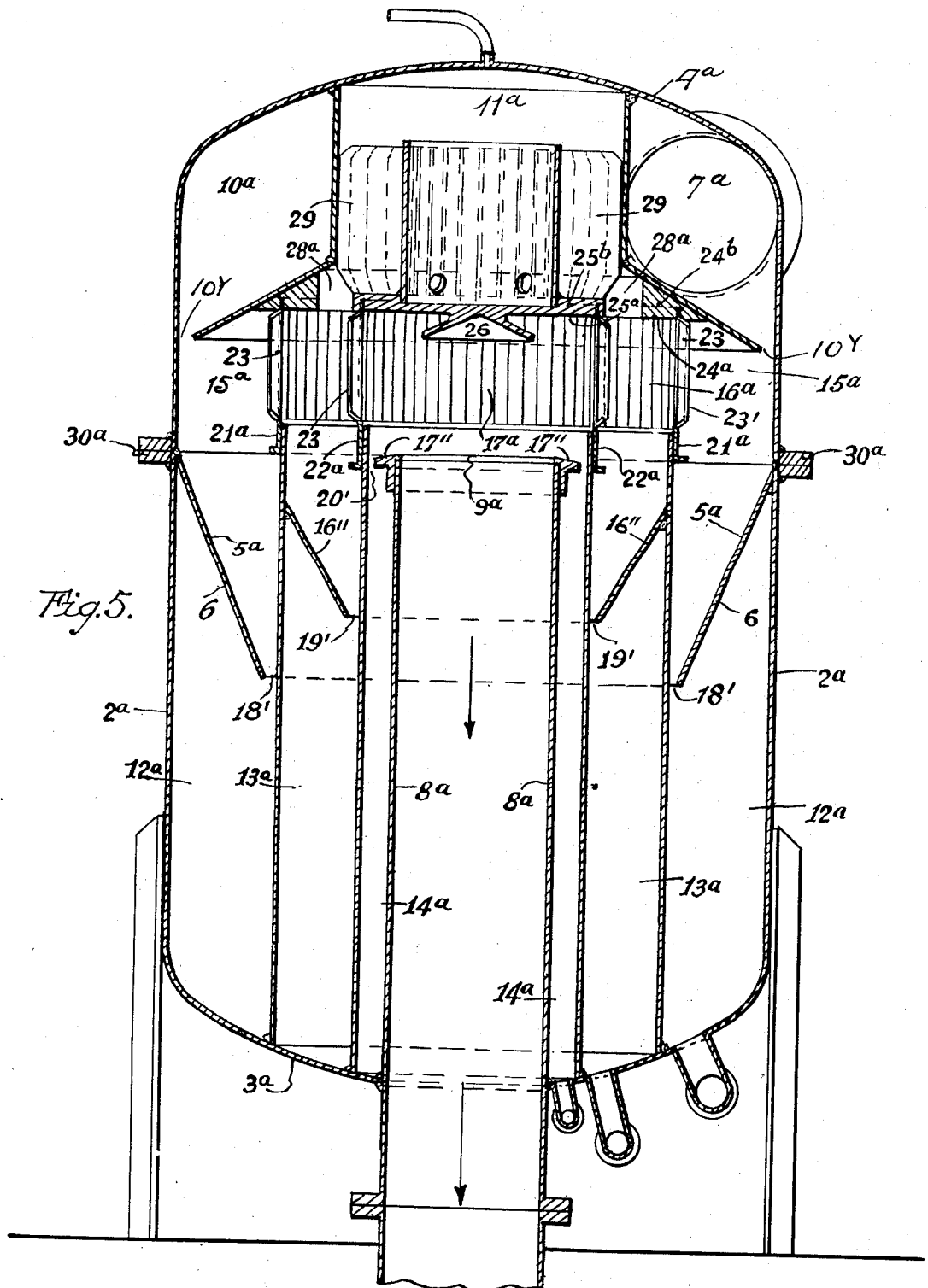

Patented Nov. 30, 1937

2,100,661

UNITED STATES PATENT OFFICE 2,100,661

LIQUID PURIFIER

Charles Gilbert Hawley, Chicago, Ill., assignor to Centrifix Corporation, Cleveland, Ohio, a corporation of Ohio Application November 16, 1934, Serial No. 753,383

4 Claims. (Cl. 209—211)

More often than not, water which is to be used industrially is taken from streams and contains silt, gritty matter and sometimes floating impurities which are highly objectionable in the uses to which the water is put. Clearly, all such waters might be purified by slow sedimentation. But such systems involve expenditures that are usually prohibitive and the object of this invention is to provide relatively small and cheap apparatus through the use of which water moving through a piping system at normal rates may be purified or clarified at any desired point in its travel.

This invention is of a centrifugal nature comprising a generally cylindrical separating chamber wherein the moving water is set into a slow rotation which accomplishes the separation of the impurities, allowing the water to pass onward in a purified state. Having no moving parts, the apparatus is dependent for its results upon the movement or passage through it of the water itself.

At this point a difficulty is usually encountered. It is well known that solids may be at least partially separated from water by causing the water to swirl within a container interposed in its travel but it has proven difficult to so harmonize the movement of the liquid in different parts of the apparatus as to avoid turbulences and vortices that cause the re-suspension or re-entrainment of much of the matter which should have been separated. Special difficulty is experienced in the apparently simply matter of holding and discharging the substances after they have been centrifugally separated. This invention includes means by which all these difficulties are overcome and all within apparatus of very simple construction.

The invention will be readily understood upon reference to the drawings that form part of this specification, and in which:—

Fig. 1 is a vertical section of a water purifier embodying this invention, the same being of the upflow or upward delivery type;—Fig. 2 is a compound horizontal section, one-half upon the line a—a of Fig. 2 and one-half upon the line b—b thereof;—Fig. 3 is a horizontal section on the line c—c of Fig. 1;—Fig. 4 is an enlarged sectional detail illustrating the preferred construction of the liquid sub-dividing and whirl promoting tuyères which are component parts of this apparatus;—and, Fig. 5 is a vertical section like unto Fig. 1 but illustrating the invention as a liquid purifier of the downflow type.

Although primarily intended for the purification of industrial water supplies it will be apparent that this invention is also applicable to the purification of other liquids, provided they also are in a state of flow or stream movement within a conduit wherein this apparatus may be included.

As shown, the apparatus of this invention is of generally cylindrical form and of a height which usually exceeds its diameter. The cylindrical shell 2 of Fig. 1 and the corresponding part 2a of Fig. 5 are necessarily closed at the bottom, as by respective bottom parts 3 and 3a. Either shell may be left open at the top if suitably extended; but generally and most conveniently the top of the shell is closed, as by a dished or convex head, marked 4 in Fig. 1 and 4a in Fig. 5. This enables the purifier to be used even in high pressure lines.

In contrast to the simple cylindrical form of Fig. 5, the casing of Fig. 1 is of two diameters, the larger top portion being joined to the smaller bottom portion by the steeply pitched conical section 2'. The internal surface 5 of that section plays a vital part in the performance of the apparatus. Essentially it is reproduced in Fig. 5 but there the vital surface, 5a, is presented by a conical flange 6 only the top of which is attached to the shell 2a.

These differences direct attention to the fact that the invention is less concerned with the outward form of the apparatus than with the shape and dispositions of its inner parts and surfaces. Though of different outward appearance the purifiers of Figs. 1 and 5 are internally substantially identical, except as influenced in design by the direction of the discharge.

As before indicated, the purifier of Fig. 1 is of the upflow type whereas that of Fig. 5 is the downflow type, necessitating slight differences in internal construction.

In both designs the liquid enters through a tangential inlet, marked 7 in Fig. 1 and 7a in Fig. 5. That inlet is disposed in the extreme top of the shell. In both cases the outlet leads from a point below the level of the inlet but still distant from the bottom of the purifier. The outlet pipe of Fig. 1 is identified as the part 8 and the outlet orifice proper is marked 9. The corresponding parts of Fig. 5 are marked 8a and 9a, respectively. These outlet pipes are coaxial with the shell and identical in function, only in one case the outlet extends through the top of the shell and in the other through the bottom thereof.

The movement of water through industrial piping systems varies in rate or velocity, being generally one to three feet per second. Higher rates are less common. The present apparatus is intended to accommodate the liquid and to accomplish its purification whatever the rate of its passage and it is believed to be efficient at rates even greatly exceeding the highest here mentioned.

Due to the manner of its tangential entrance the water necessarily takes on a whirling motion of corresponding velocity within the large annular reception space 10 provided in the top of the shell. It is, however, prevented from moving directly to the outlet. As will become clear, the preventive means employed hereunder provide successive stages of purification, each serving to force the water to move in relatively thin stream formation and in slow whirling condition against restraining surfaces which serve to receive the impurities and direct them safely into quiet spaces wherein they are shielded from the main sweeping forces of the moving liquid.

In each stage the apparatus provides for a substantial repression of whirling movement before the next stage begins, a feature which is essential if detrimental turbulence is to be avoided. By such so-called directing and preventive means, more fully described hereinafter, successive whirling impulsions of the water are generated and in each stage advantage is taken of the most vigorous of the swirling movements to accomplish the necessary centrifugal separation and the continuous delivery of separated matter to respective places of safe storage. Additionally, in each stage the invention provides special means for protecting the separated matter from disturbance, thus obviating its possible re-entrainment.

In one sense this invention may be classified as a grader, for it not only serves to clarify or rid the flowing water of impurities, but also in its best forms serves to separate the impurities themselves according to their differing specific gravities. Some of the impurities are lighter than water and these are separated and collected in a riser chamber 11. Heavy matters which sink readily are collected in an annular bottom compartment 12. Those somewhat lighter, are collected in a smaller annular compartment 13, and the finest and lightest of the settleable impurities are lodged in a central compartment 14. Drains or blow-off connections are provided for all these compartments or collection chambers and being quite distant from those parts of the purifier in which the vigorous activity occurs, these compartments may be cleared whenever desired, without interrupting the continuity of the purifying process.

The "active" or high velocity separating compartments of this purifier occupy the upper part of the shell and in Fig. 1 are to be identified as follows:—First, the above mentioned annular reception space 10; second, the underlying annular compartment 15;—third, the intermediate annular compartment 16; and fourth, a central compartment 17. The purified water outlet leads from the central compartment. In Fig. 5 the corresponding compartments are marked 10a, 15a, 16a and 17a. It is to be understood that the entire purifier is filled with water throughout the period of its operation, except perhaps that the top or dome of the "floats" compartment 11 may at times contain a volume of separated gases, again to be mentioned.

In each of the "active" compartments the water is caused to whirl downward within the outer part of the compartment while the remainder of the compartment is filled with water moving at lower velocity and in a general upward direction and always in the same direction. Thus the whirling water is made to leave the bottom of the top reception compartment through a narrow circumferential slot, the outer circumference of which is preferably formed by the enclosing shell. In the case of Fig. 1 such slot is marked 10x while in Fig. 5 it is marked 10y. The area of the slot may considerably exceed that of the inlet 7 but the effect is to cause the water to whirl downward in a relatively thin cylindrical layer or sheet, easily distinguishable from the larger body of water occupying the remainder of the compartment (15, 15a). As will be explained, the water is caused to move in a similar manner as it enters the intermediate and central compartments of the purifier. Meantime, it is to be noted that the downward moving currents are caused to substantially exhaust their downward whirling force in a contracted lower part of each compartment, and in each case, against an opposingly inclined bottom portion which leads to or terminates in a restricted opening, preferably always a narrow circumferential slot that opens into an underlying settling compartment. Thus the bottoms of the compartments 15, 16 and 17 of Fig. 1 are steeply inclined inwardly and downwardly and are the parts respectively marked 5 and 16' and 17'; while the discharge slots mentioned, are there marked 18, 19 and 20, respectively. Corresponding parts and slots in Fig. 5, are marked 5a, 6'', 17'' and 18', 19' and 20'.

Clearly, the communication between the active compartments and the underlying settling compartments is limited to the narrow discharge slots shown. The manner in which communication is established in the case of the "floats" compartments 11, 11a, is very different, and will be made clear hereinafter.

The liquid which moves from the outer compartment (15, 15a) into the intermediate compartment (16, 16a) is not permitted to move directly toward the outlet but instead is "layerized" and caused to whirl downward and substantially exhaust its force within the contracted lower part of the intermediate compartment 16. The same thing is true of the liquid which leaves the intermediate compartment and enters the central compartment (17, 17a). Such movement of the liquid is brought about in each case by a fixed element which divides the water into thin streams entering the compartment tangentially and the water is compelled to take on a whirling motion therein. Next, the downward movement of the water is compelled by means fixedly positioned to prevent the upward movement or relief thereof, but permitting downward movement. By such layerizing and downward enforcement of movement in each case, the entrained matters, if any, are collected against the encompassing wall and are caused to spiral downward; and upon meeting the slanting bottoms of the compartment, to be discharged through the bottom slot thereof.

This internal stream-forming means in each case comprises a multiply tuyèred cylindrical admission wall called a whirl promoting tuyère. In each purifier shown there are two such tuyères; one positioned between the outer and intermediate active compartments and the other positioned between the intermediate and central active compartments. In Fig. 1, these tuyère parts are marked 21 and 22, and in Fig. 5, 21a and 22a. Each comprises a thin-walled cylindrical part containing a large number of slot-like tangential tuyère openings 23, each in the form of a narrow vertically extended slot. These slots are defined by a corresponding number of tangential blades 23', preferably sheared and struck from the piece of metal forming the cylindrical wall (see Figs. 2 and 4). All blades and hence all tuyère openings are inclined in the same direction.

The harmonious action of all parts of the swirling water currents and bodies is more important than the velocity of the movement engendered by these tuyères. Slow rather than fast movement is required. And hence in the aggregate the area of the tangential admission openings in the tuyère belonging to the central compartment is made to be much larger than the area of the adjacent fluid outlet. For example, the effective area of that tuyère may be twice the area of said outlet. Next, it is to be noted that the area of the tuyère which is positioned between the outer and intermediate active compartments is still larger in capacity with relation to said outlet area. In other words, care is observed to very slowly release the water which has parted with its heavy impurities in the outer compartment (15, 15a) and thereafter to cause the partially purified water to enter the intermediate compartment slowly and yet attain to a state of uniform vortical movement throughout the inner circumference of the intermediate compartment. Such slow movement, coupled with the downward movement described, is more effective than swift movement, and upward relief being prevented, the slow whirling movement results just as surely in the downward travel required to convey the closely contained solids to the discharge slot at the bottom of the compartment. The movement within the central compartment may be somewhat more rapid for as its radius is smaller it is less difficult to attain uniform and harmonious rotation therein; and furthermore, it is desirable that the whirling water shall descend quite vigorously against the slanting floor part (17', 17'') of the central compartment.

The preferred construction or arrangement of the described whirl promoting tuyères is such that the rotative movement of the liquid has the same direction in all of the active compartments (see Fig. 2). But it is to be understood that the invention comprehends a reversal of direction in succeeding compartments; notwithstanding the fact that such reversals necessarily involve added turbulences and resistances to the movement of the water and increase the "pressure drop" as measured between the inlet and outlet of the purifier.

The means employed to definitely prevent upward relief or pressure and compel the downward movement of water in the outer part of each intermediate and central compartment comprises an annular abutment portion immediately adjacent the top of the tuyère portion and extending radially inward therefrom. In Fig. 1 the annular abutment portions are marked 24 and 25, respectively and in Fig. 5 the corresponding parts are marked 24a and 25a. Obviously, with respect to each compartment, the liquid moves at highest velocity as it enters through the tangential tuyère openings. Therefore its effective pressure is greater in that circumference than in the more central parts of the compartments. Such being the case and relief of pressure being blocked by the presence of the abutment portion at the top of the tuyère, the water of necessity swirls downward into the unobstructed lower part of the compartment. Thus the described separation and the delivery of solids to the discharge slot is ensured.

By preference, the abutment portions are metal castings and the tops of the tuyère parts are secured therein in the process of making those castings. In the instance of Fig. 1, both abutment portions are cast rings and the inner one joins the lower end of the outlet pipe 8 and contains the central outlet 9. In the case of Fig. 5, the abutment portion 24a is supplied by a like ring 24b, but the abutment portion 25a is formed by the cover plate 25b belonging to the central compartment 17a, and tuyère element 22a; that construction harmonizing with the arrangement of the fluid outlet 9a at the bottom of the space 17a. The part 26, centrally located beneath the cover plate 25b, comprises a vortex defeating cone working opposite the outlet 9a. A similar element 27 appears in Fig. 1, being positioned in the lower part of the chamber 17 opposite the outlet 9.

Reverting now to the "floats" collecting chamber (11, 11a) attention is called to the annular space (28, 28a) which is provided between the abutment forming parts described. That space communicates directly with the open lower end of the riser chamber (11, 11a) and all light substances which rise in the top of the intermediate compartment (16, 16a), pass upward through the space (28, 28a) and thence ascend within the water filled riser or "floats" compartment (11, 11a). A continuation of rotation within that compartment would inevitably result in the formation of downward moving vortices which would re-entrain the light substances. To defeat such motion the riser chamber is made to contain a plurality of vertical baffle plates (29, 29a) as shown in Fig. 2 which stop the rotation of the water and permit the quiet retention of the light substances, which therefore rise into the top of the riser compartment or dome.

From the foregoing description it will be clear that heavily burdened water which enters through the tangential inlet 7 parts with its heavier impurities while swirling downward within the outer separating compartment (15, 15a), such impurities being delivered to the settling compartment (12, 12a). The settling compartment is of course filled with water and little whirling movement is imparted through the discharge slot, that opening being relatively small and also for the reason that the downward whirling streams exhaust their force against the inclined bottom of the "active" compartment (15, 15a). Upon reaching the contracted lower part of the chamber (15, 15a) the liquid reacts upwardly. The upward action takes place rather slowly by reason of the large cross sectional area available. Upon reaching the upper inner part of the chamber (15, 15a), the liquid finds escape through the many tuyères 23 offered by the tuyère element (21, 21a) and as described the moving liquid immediately takes on a whirling movement within the intermediate compartment (16, 16a).

The lighter substances yield less readily to the downward thrust in said intermediate compartment and escape upward into the open space (28, 28a) thence rising into the quiet collecting compartment or dome 11, 11a. Such lighter matters may comprise gases, oils and the like, which collect in the top of the drum. They may be removed continuously or intermittently through a suitably valved blow-off pipe, as shown. Meantime, the streams spiralling downward within the tuyère element and compartment (16, 16a) centrifugally deposit a residue of solids and those solids are urged downward upon the slanting floor (16', 16") for discharge through the slot (19, 19') and into the quiet collecting compartment (13, 13a).

Concurrently, the whirling currents which have substantially exhausted their forces, react upward and moving slowly, the water next enters the tuyère (22, 22a) belonging to the central compartment (17, 17a). Therein the performance is repeated at somewhat higher velocity and the fine solids centrifugally separated are driven downward through the slot (20, 20') into the central compartment (14, 14a). The purified liquid passes off through the central outlet described.

As clearly shown in Figs. 1 and 5, each settling compartment in the base of the purifier is provided with a valved blow-off pipe by which it may be emptied.

For convenience, the upper and lower parts of the purifier are joined by packed and bolted flanges (30, 30a) and if desired the whole top of the purifier may be removed, to afford access to the internal parts. At such time the purifier top carries with it the tuyère elements. The lower ends of the latter normally are merely telescoped tightly upon the tops of cylindrical walls that define the lower parts of the active compartments and the upper parts of the settling compartments.

The foregoing description clearly identifies the various compartments within the purifier and this without reference to the specific forms of the walls which separate the different compartments. Clearly, the compartments and their functions and relations to one another are of the greater importance. The shapes of the compartment-forming walls are of lesser importance, though still important. Such walls may partake of many different designs, as well indicated by the contrasted figures of the drawings.

Having thus described my invention I claim as new and desire to secure by Letters-Patent:

1. The herein described process for the purification of flowing liquid which consists in organizing the moving liquid into coaxial vortices, one within the other, feeding the liquid into the vortex of large diameter and permitting its outflow to and through the vortex of less diameter, and in each said vortex compelling the liquid to move downward in cylindrical sheet form and to substantially exhaust its downward whirling force before then reversing the direction of liquid flow to permit its outflow at a level above that of such reversal outflow therefrom, discharging centrifugally separated solids at such levels of exhaustion and reversal, and, into bodies of liquid sufficiently quiet to permit sedimentation therein, and discharging sedimented matters from the bottoms of such bodies.

2. The herein described process for the purification of flowing liquid which consists in organizing the moving liquid into coaxial vortices, one within the other, feeding the liquid into the vortex of large diameter and permitting its outflow to and through the vortex of less diameter, in each said vortex compelling the whirling liquid to move downward in cylindrical sheet form and to substantially exhaust its whirling force before outflow therefrom, discharging centrifugally separated solids at such levels of exhaustion, and into bodies of liquid sufficiently quiet to accomplish sedimentation therein, discharging sedimented matters from the bottoms of such bodies, permitting floatable substances to escape upwardly from one said vortex and into a region of relatively quiet liquid, suppressing rotation in the latter to prevent vortical re-entrainment of said substances, and discharging the floatable matters form the top of the quiet liquid.

3. The herein described liquid purifier comprising a vertically positioned cylindrical shell closed at the bottom and in its upper portion containing a plurality of coaxial vortical separating compartments, one within the other, the smallest terminating in an axial outlet, means for whirlingly feeding the liquid into the outer compartment in cylindrical sheet form and compelling its downward movement against the inner wall of the shell, whirl promoting means at the entrance of each inner compartment, means similarly compelling the downward whirling flow of the liquid in sheet form in each compartment, an inclined floor portion forming the bottom of each said compartment and positioned to receive and substantially exhaust the whirling force of the liquid and cause its slow upward reaction in advance of entrance to the next compartment or outlet, said shell containing in its lower part coaxial settling chambers corresponding to respective inclined floor portions and in restricted communication with respective vortical compartments above said inclined floor portions.

4. The herein described liquid purifier comprising a vertically positioned cylindrical shell closed at the bottom and in its upper portion containing a plurality of coaxial vortical separating compartments, one within the other, the smallest terminating in an axial outlet, means for whirlingly feeding the liquid into the outer compartment in cylindrical sheet form and compelling its downward movement against the inner wall of the shell, whirl promoting means at the entrance of each inner compartment, means similarly compelling the downward whirling flow of the liquid in sheet form in each compartment, an inclined floor portion forming the bottom of each said compartment and positioned to receive and substantially exhaust the whirling force of the liquid and cause its slow upward reaction in advance of entrance to the next compartment or outlet, said shell containing in its lower part coaxial settling chambers corresponding to respective inclined floor portions and in restricted communication with respective vortical compartments, and the upper part of said shell containing a riser chamber in non-whirling communication with the upper part of an inner vortical compartment, for the reception and retention of impurities which are lighter than the liquid.

CHARLES GILBERT HAWLEY.